United States Patent [19]
Ghosh et al.

[11] Patent Number: 5,993,750
[45] Date of Patent: Nov. 30, 1999

[54] INTEGRATED CERAMIC MICRO-CHEMICAL PLANT

[75] Inventors: Syamal K. Ghosh; Dilip K. Chatterjee, both of Rochester; Edward P. Furlani, Lancaster, all of N.Y.

[73] Assignee: Eastman Kodak Company, Rochester, N.Y.

[21] Appl. No.: 08/835,979

[22] Filed: Apr. 11, 1997

[51] Int. Cl.$^6$ ........................................ B01J 8/04
[52] U.S. Cl. .................... 422/191; 62/51.1 R; 62/115; 62/498; 165/185; 361/700; 422/50; 428/40; 428/41; 428/50; 428/53; 428/106
[58] Field of Search .................. 428/40, 41, 50, 428/53, 166; 422/50, 130, 191; 165/185; 361/700; 62/498, 115, 51.1 R

[56] References Cited

U.S. PATENT DOCUMENTS

| | | |
|---|---|---|
| 4,386,505 | 6/1983 | Little ...................................... 62/514 R |
| 4,392,362 | 7/1983 | Little ...................................... 62/514 R |
| 4,516,632 | 5/1985 | Swift et al. .............................. 165/167 |
| 5,209,906 | 5/1993 | Watkins et al. .......................... 422/200 |
| 5,230,866 | 7/1993 | Shartle et al. ........................... 422/103 |
| 5,534,328 | 7/1996 | Ashmead et al. ....................... 428/166 |

*Primary Examiner*—Timothy McMahon
*Attorney, Agent, or Firm*—Raymond L. Owens

[57] ABSTRACT

An integrated micro-ceramic chemical plant having a unitary ceramic body formed from multiple ceramic layers in the green state which are sintered together including the unitary ceramic body defining a mixing chamber and passage means for providing communication with the mixing chamber so that two or more fluids may be delivered to such mixing chamber for mixing or reacting chemicals in the fluids; and the unitary ceramic body including means for delivering the mixed chemicals to exit from the unitary ceramic body.

10 Claims, 9 Drawing Sheets

INTEGRATED CERAMIC MICRO-CHEMICAL PLANT

FIELD OF THE INVENTION

The present invention relates to an integrated ceramic micro-chemical plant which can be used to mix, react or analyze chemicals.

BACKGROUND OF THE INVENTION

Micro-engineering is a rapidly growing field which will impact on many applications over the coming years. Three-dimensional micro-engineered devices and systems involving silicon planar technology can be produced with features from one to a few hundred microns having tolerances in micron or as small as submicron level. Most of the current micro-engineering technologies are evolved from the adaptation of thin films, photolithographic and etching technologies generally applied to silicon wafers on which silicon mono oxide, silicon dioxide, silicon nitride and the like thin films are deposited and etched thereafter yielding planar configurations Advances have been made to study chemical processes based on microfluidic systems technology using planar structures on silicon chips. Predictive flow modeling has also been developed to realize the benefits from the microfluidic technology.

The performance of chemical processing is strictly governed by the mass transport and sometimes thermal transport properties of the system. It is therefore essential to understand how miniaturization affect the chemical processes. Laminar flow of an ideal fluid in a tube or channel is well characterized. Pfahler et al have demonstrated in an experiment using channels of various geometry on silicon wafers that there is an agreement between experiment and theory concluding that the conventional Hagen-Poiseuille equation is obeyed down to a scale of few microns. Laminar volume flow per unit time, $Q_f$, of an ideal fluid in a circular pipe is described by the Hagen-Poiseuille equation:

$$Q_f = \frac{\Pi}{8\mu_f} \cdot \frac{dp}{dx} r^4$$

where $\mu_f$ and r are the fluid viscosity and tube radius respectively, dP/dX is the pressure gradient along the x-direction of flow.

As the channel widths are reduced, the fluid flow becomes more laminar which provides control over the distribution of material and that dictates that liquid mixing be achieved by diffusion or other molecular migration processes rather than by turbulence. This problem of mixing can be solved by commercially available software packages on computational fluid dynamics. A measure of degree of mixing, F, can be estimated from the expression $F=Dt/l^2$, where D is a reactant diffusion constant, t is contact time allowed for mixing and 1 is distance across a reactant stream. Quantitatively, mixing may be defined as substantial to nearly complete for F values from 0.1 to 1. Typical near complete mixing of two liquids in 1 second corresponds to channel widths of 100 $\mu$m.

Similar arguments apply to heat transfer in micro-channels under laminar flow conditions. Understanding of this laminar heat flow process is useful in designing and building micro heat exchangers and chemical micro-reactors.

The current planar silicon technologies are inadequate for the fabrication of an integrated and self-contained micro-chemical plants having embedded structure and unitary construction.

SUMMARY OF THE INVENTION

It is an object of the present invention to provide an integrated micro-ceramic chemical plant.

It is another object to provide an integrated micro-ceramic chemical plant which is less than one thousandths the size of an average industrial chemical plant.

These objects are achieved in an integrated micro-ceramic chemical plant having a unitary ceramic body formed from multiple ceramic layers in the green state which are sintered together comprising:

(a) the unitary ceramic body defining a mixing chamber and passage means for providing communication with the mixing chamber so that two or more fluids may be delivered to such mixing chamber for mixing or reacting chemicals in the fluids; and (b) the unitary ceramic body including means for delivering the mixed or reacted chemicals to exit from the unitary ceramic body.

Integrated micro-ceramic chemical plants have a number of advantages:

1. By reducing the dimensions of the plant it is possible to ensure good mixing in a short time without the need to introduce turbulence. For those liquids which require turbulence mixing can also be incorporated in the plant.

2. More efficient thermal control is possible because of large surface to volume ratio. Since relatively small quantities of chemicals are used in the micro-channels at any given time, the risk of chemical explosion is also reduced. It is also possible to shut down the process very quickly.

3. Catalytic reaction can be enhanced by providing a large surface to volume ratio by introducing reactants to catalytic surfaces. Additionally, the precise geometry of a micro-ceramic chamber or channel can be used to control the contact time and the chemical reaction process.

4. The integrated micro-ceramic chemical plants help accurate monitoring of the process in situ facilitating process parameters changes.

5. Scaling up the production process is possible by incorporating an array of integrated micro-ceramic chemical plants rather than increasing the volume of the reaction vessels which very often necessitates the change in process parameters.

6. The well defined geometry and ceramic materials selection of the integrated micro-ceramic chemical render them an ideal research tool to study chemical processes.

7. Since the integrated micro-ceramic chemical plants are small in size they can be easily and cost-effectively transported from one place to another.

8. Integrated micro-ceramic chemical plants can withstand harsher chemical environment and higher operating temperatures than those made using conventional silicon technologies.

9. Unlike the conventional silicon technologies, three dimensional embedded channels and other complicated features can be produced within a ceramic body using micro-molding techniques.

10. One of the greatest attributes of integrated micro-ceramic chemical plant is that the emission of effluent gases and discharge of toxic chemical by-products can be effectively controlled enabling the integrated micro-ceramic chemical plant to be environmentally compatible.

BRIEF DESCRIPTION OF THE DRAWINGS

FIG. 4b is a cross-sectional view along the lines 4A—4A of FIG. 4a;

FIG. 4c is a cross-sectional view along the line 4B—4B of FIG. 4a;

DETAILED DESCRIPTION OF THE PREFERRED EMBODIMENTS

Figure 1:
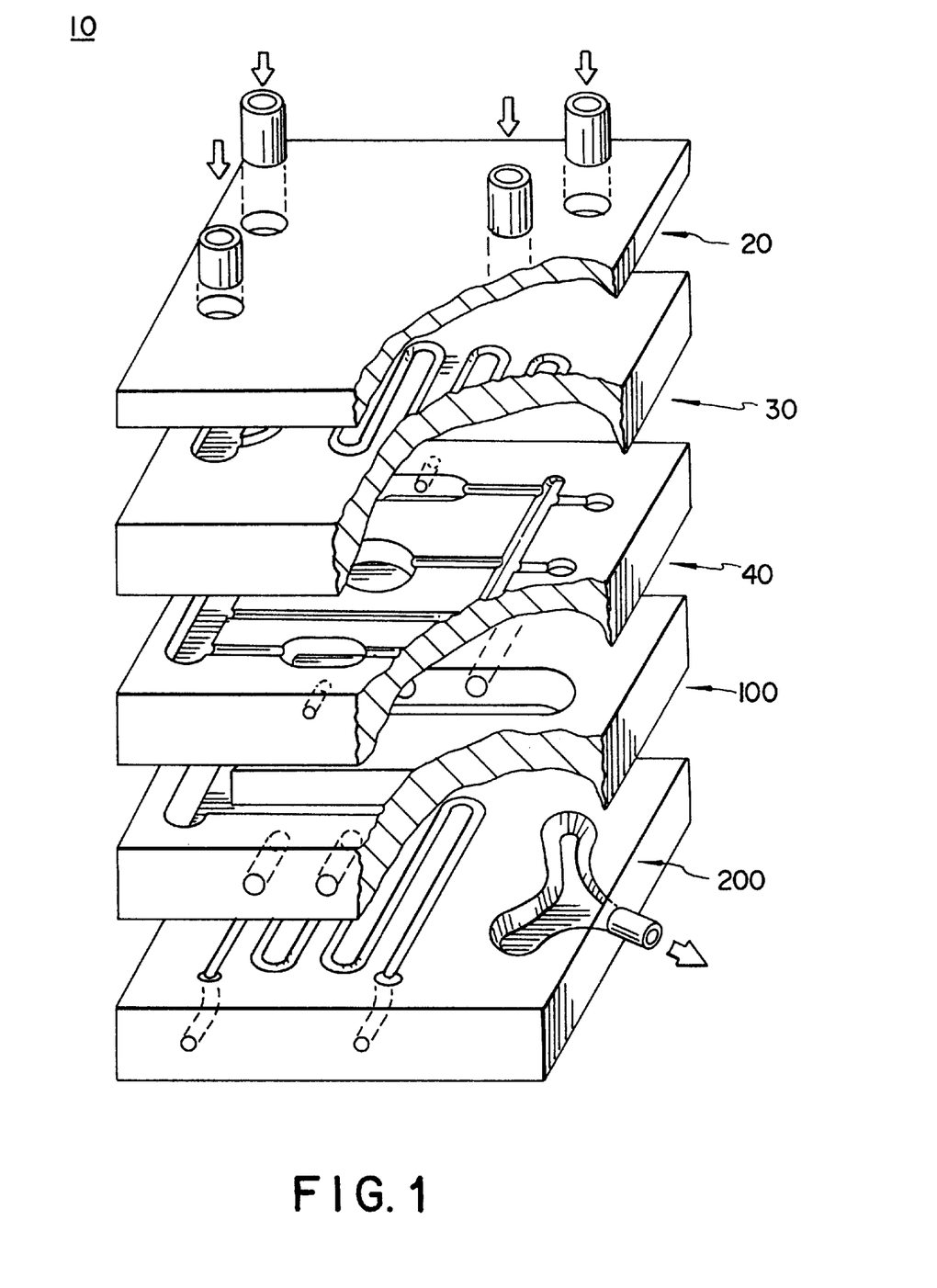
FIG. 1 is an exploded perspective of an integrated micro-ceramic chemical plant in accordance with the present invention.

Referring to FIG. 1, a perspective is illustrated of an unitary ceramic body 10 which includes five different ceramic layers. The individual ceramic layers are initially in the green state, but are sintered together to form the unitary ceramic body 10. The top ceramic layer 20 of the unitary ceramic body 10 has passageways 12 and 14 on opposite sides of the unitary ceramic body 10. (See FIG. 2) The passageways 12 and 14 are adapted to receive fluids containing chemicals which are to be mixed, reacted and analyzed in accordance with the present invention. It is to be noted that the top ceramic layer 20 may contain more than two passageways 12 and 14. The passageways 12 lead directly to the second ceramic layer 30 which includes mixing chamber 31 and mixing channels 26. Alternatively, the passageways 14 can lead directly to the third ceramic layer 40 in order to bypass the mixing chamber 31. The third ceramic layer 40 defines reaction chambers 44, 46, 48. (See FIG. 4a) Referring to FIG. 1 again, the fourth ceramic layer 100 includes analyzing channels 72 for analyzing the chemical process. The bottom or fifth ceramic layer 200 includes a discharging channel 80 for discharging the reacted product. Also embedded heating coils 84 are formed in the fifth ceramic layer 200 for heating the unitary ceramic body 10. It will be understood that the embedded heating coils 84 do not necessarily have to be placed in the fifth ceramic layer 200 as long as they heat the entire unitary ceramic body 10.

The present invention involves an integrated micro-ceramic chemical plant. When the term "micro" is used it refers to the fact that the features within the chemical plant have dimensions of about 100 micrometers or less. The unitary ceramic body 10 is formed by multiple ceramic layers in the green state which are sintered together. These layers can typically have dimensions 10 to 100 mm wide, 10 to 100 mm log, and 1 to 10 mm thick.

The use of the term "green" means that when particulate ceramic powder, preferably mixed with an organic binder is subjected to uniform compacting forces in order to provide an unsintered preform which has uniform density. One particular effective material is a tetragonal zirconia ceramic powder that can be micromolded to form the layer by standard methods such as injection molding, gel casting, tape casting, dry pressing or cold isostatic pressing. Other ceramic materials which can be used are ceramics such as $Al_2O_3$, $ZrO_2$, AlN, BN, MgO, $Al_2O_3$—$ZrO_2$, SiC, $Si_3N_4$ and other oxide and non-oxide ceramics and their composites thereof.

The features within each layer such as chambers, channels and passageways can be formed as follows:

(a) features like feed-through, through-holes, mixing chambers and reaction chambers can be formed in each layer in the green stage by incorporating those features in the mold. Approximately, 20% to 50% larger features must be made to account for shrinkage during sintering. The amount of shrinkage-depends on the relative amount of organic binders in the ceramic mixture. Typically, 2% to 5% by weight organic binders are added for compaction processes such as cold isostatic pressing and dry pressing. On the other hand, 10% to 40% by weight organic binders are added for compaction processes such as gel casting, tape casting and injection molding.

(b) features like embedded helical coils and heating coils can be formed by placing sacrificial members comprising organic polymers which are burned away during the sintering process. The details of forming embedded microfeatures are described in the commonly assigned U.S. patent application Ser. No. 08/775,523, filed Jan. 2, 1997, entitled "Miniature Molded Ceramic Devices Having Embedded Spiral Coils" by Chatterjee et al, and commonly assigned U.S. patent application Ser. No. 08/775,524, filed Jan. 2, 1997, entitled "Method for Forming Molded Ceramic Devices Having Embedded Spiral Coils" which are incorporated herein by reference.

(c) features like microchannels can be formed by embedding sacrificial member which burn away during sintering or can be incorporated in the molding tools. During the sintering process the green ceramic layers shrink. Provision must be made to compensate for this shrinkage.

Figure 2:
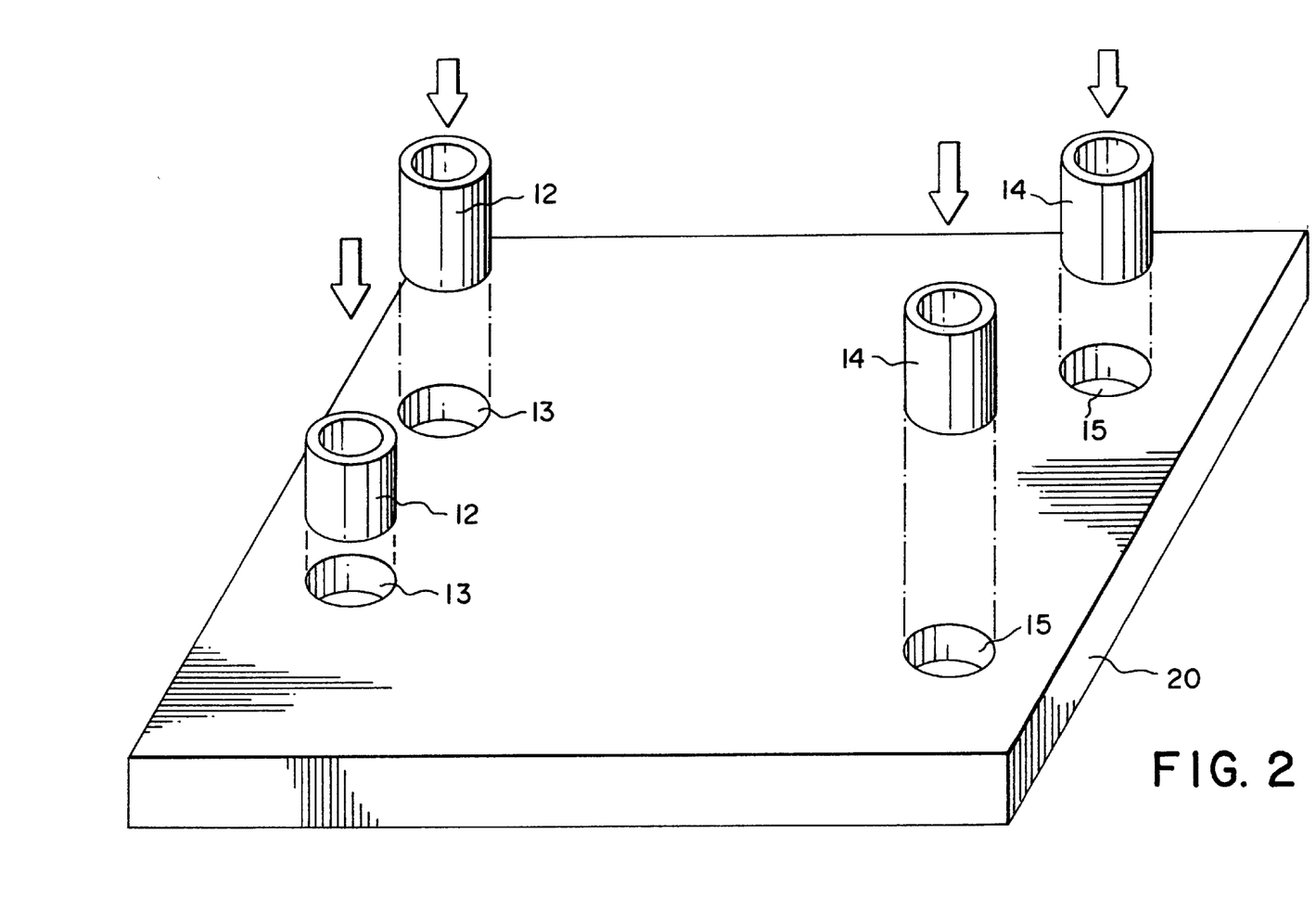
FIG. 2 is a perspective of the first ceramic layer of the unitary ceramic body shown in FIG. 1.

Referring to FIG. 2, a perspective illustrates a top ceramic layer 20 including passageways 12 and 14 arranged in two different rows. A plurality of passageways 12 forming a row are placed directly on through-holes 13 and a plurality of passageways 14 forming another row are placed directly on through-holes 15. A row of through-holes 15 (for clarity of illustration, only two are shown) are connected to a row of through-holes 29 in the mixing chamber (second ceramic layer 30) and feeds into the distributing chambers 43 which are connected to a distributing manifold 48a which are connected to the reaction chambers 44, 46, 48. The passageways 12 and 14 can be made by extruding ceramic powder compounded with organic binders. The top ceramic layer 20 containing the through-holes 13 and 15 can be fabricated by dry pressing ceramic powder. The top ceramic layer 20 and the passageways 12 and 14 can be sintered separately or at the same time, whereby the passageways 12 and 14 will be bonded onto the top ceramic layer 20 during sintering. If the top ceramic layer 20 and the passageways 12 and 14 forming structures are sintered separately they can be brazed or epoxy bonded later.

Figure 3A:
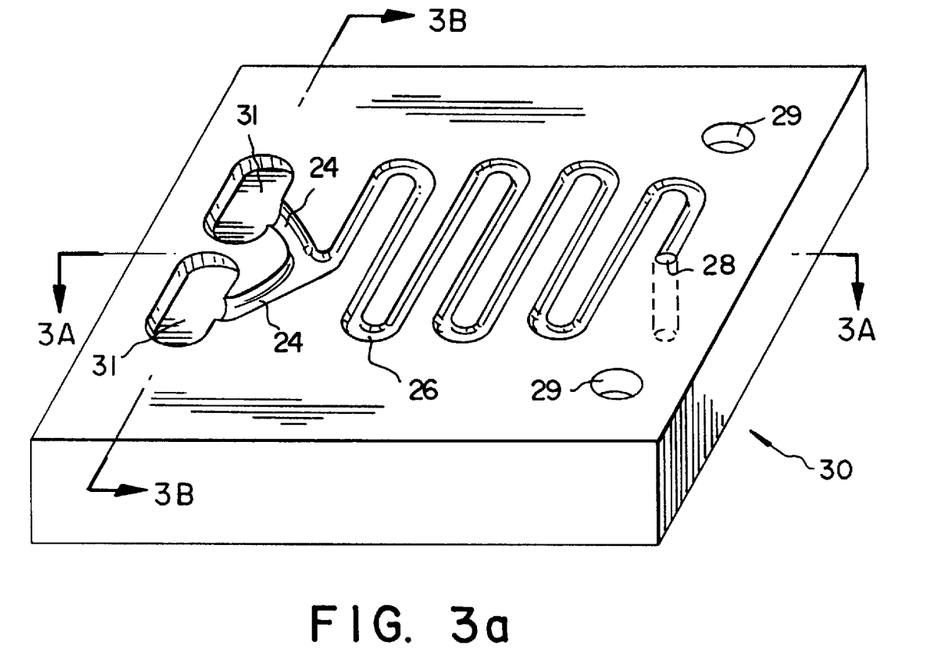
FIG. 3a is a perspective of the second ceramic layer from the top of the unitary ceramic body showing mixing channels.
Figure 3B:
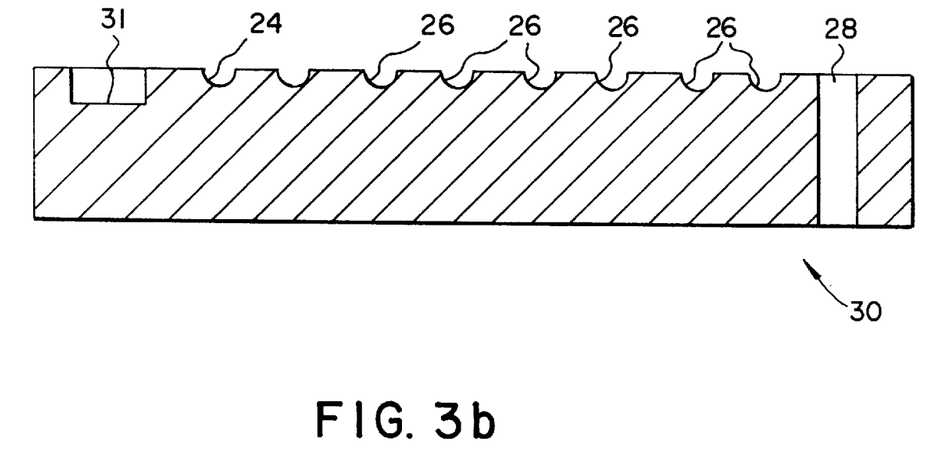
FIG. 3b is a cross-sectional end view of FIG. 3.

In FIG. 3a, a perspective is illustrated of the second ceramic layer 30 which contains mixing chamber 31 for receiving fluids containing the chemicals from the top ceramic layer 20. A plurality of channels 24 exiting from the mixing chamber 31 merge and form a single mixing channel 26 which can be configured to have straight, serpentine, complex, wavy and angular forms or shapes. A row of through-holes 29 (but only two are shown) are arranged in the second ceramic layer 30 to communicate with the passageway 14 in the top ceramic layer 20. The mixing channel 26 leads to a through-hole 28 which merges into the third ceramic layer 40. FIG. 3b represents a sectional end view of the second ceramic layer 30 in which mixing channel 26 is configured to have circular shape. The mixing chamber 31 can be of rectangular, oval, circular or any convenient shape. The through-hole 28 is directly connected to a distributing chamber 42 in the third ceramic layer 40.

Figure 4A:
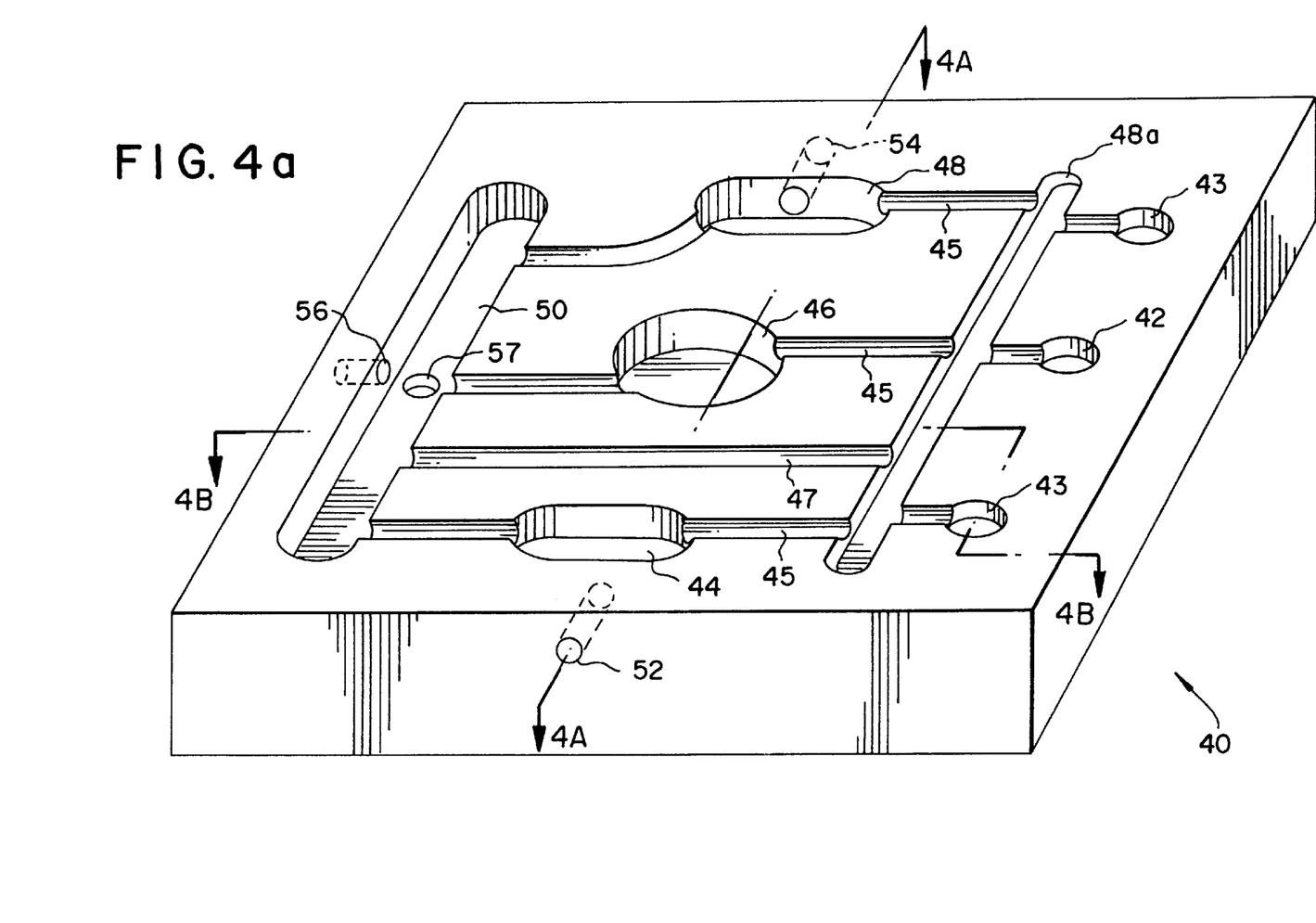
FIG. 4a is a perspective of the third ceramic layer from the top of the unitary ceramic body showing reaction chambers.
Figure 4B:
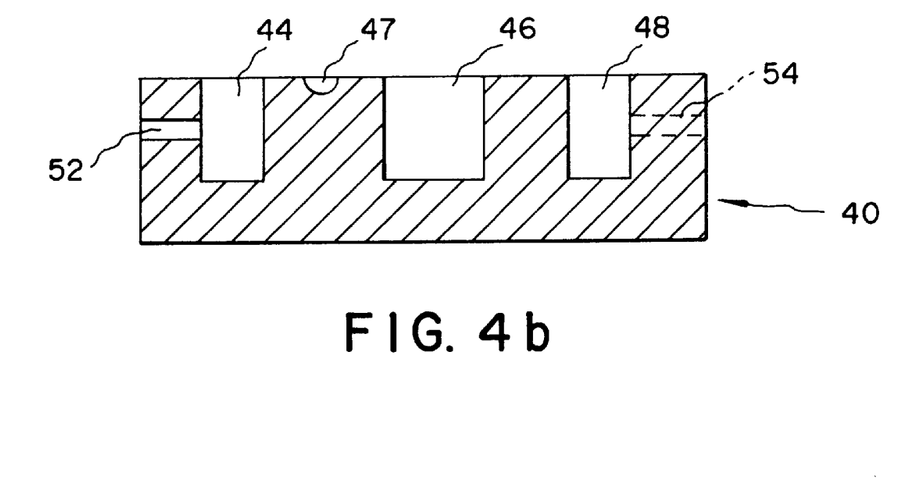
Figure 4C:
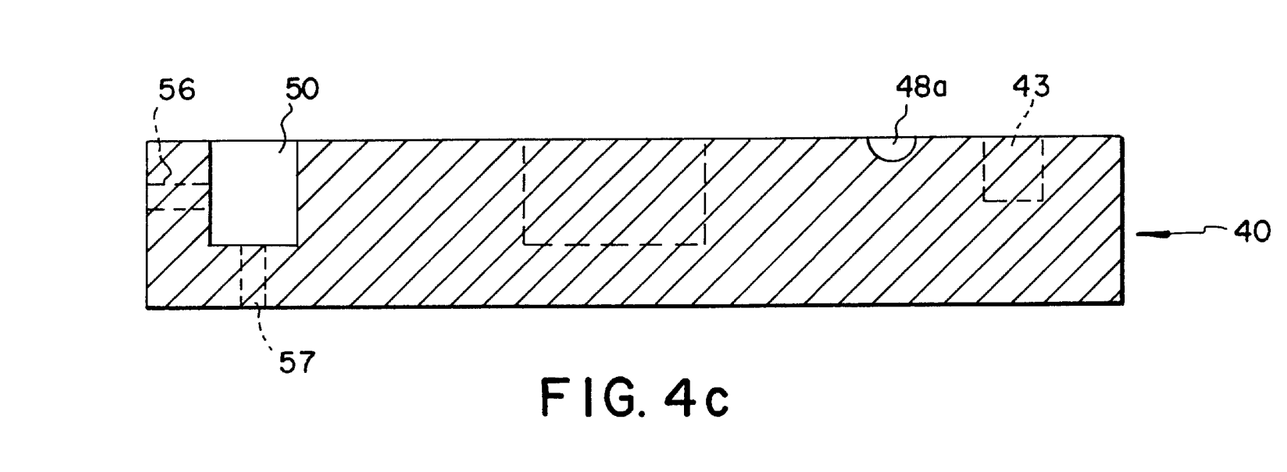

Referring to FIG. 4a, a perspective is shown of the reaction chambers 44, 46, 48 of the unitary ceramic body 10. The third ceramic layer 40 includes a plurality of communicating fluid channels 45 and 47 and a distributing manifold 48a. The through-hole 28 feeds the fluids containing chemicals to the distributing chamber 42 from where it is distributed to reaction chambers 44, 46 and 48. Additional fluids containing chemicals which do not require to be mixed in the mixing channel 26 can be fed directly to the distributing chamber 43. The reaction chambers 44, 46, 48 can be individually equipped with heaters, stirrers or filters as will be described later. The chemicals from the distributing chamber 43 are distributed individually or combined through the distributing manifold 48a to the reaction chambers 44, 46, 48. The chemicals can be delivered to the reaction chambers 44, 46, 48 separately or sequentially as the processing demands. For separate distribution to the reaction chambers 44, 46, 48 one or two way valves can be incorporated in the channels 45. Alternatively, the chemicals can bypass the reaction chambers 44, 46, 48 and be fed directly to a temporary holding tank 50 via a channel 47. The reaction chambers 44, 46, 48 include the feed-through holes 52 and 54 for inserting thermocouples and stirrers, respectively. The holding tank 50 includes a feed-through hole 56 into which a thermocouple can be inserted. Alternatively, a flow interrupter can also be inserted through a hole 57 for holding the fluid in that chamber. FIGS. 4b and 4c are cross-sectional end views along the lines 4A—4A and 4B—4B respectively of FIG. 4a. The fourth ceramic layer 100 which in communication with the holding tank 50 can either be fully or partially exposed to the next chamber. Also, as shown in FIG. 4c in the bottom of the holding tank 50 there is provided a through-hole 57 which can be opened or closed manually or automatically as desired.

Figure 5A:
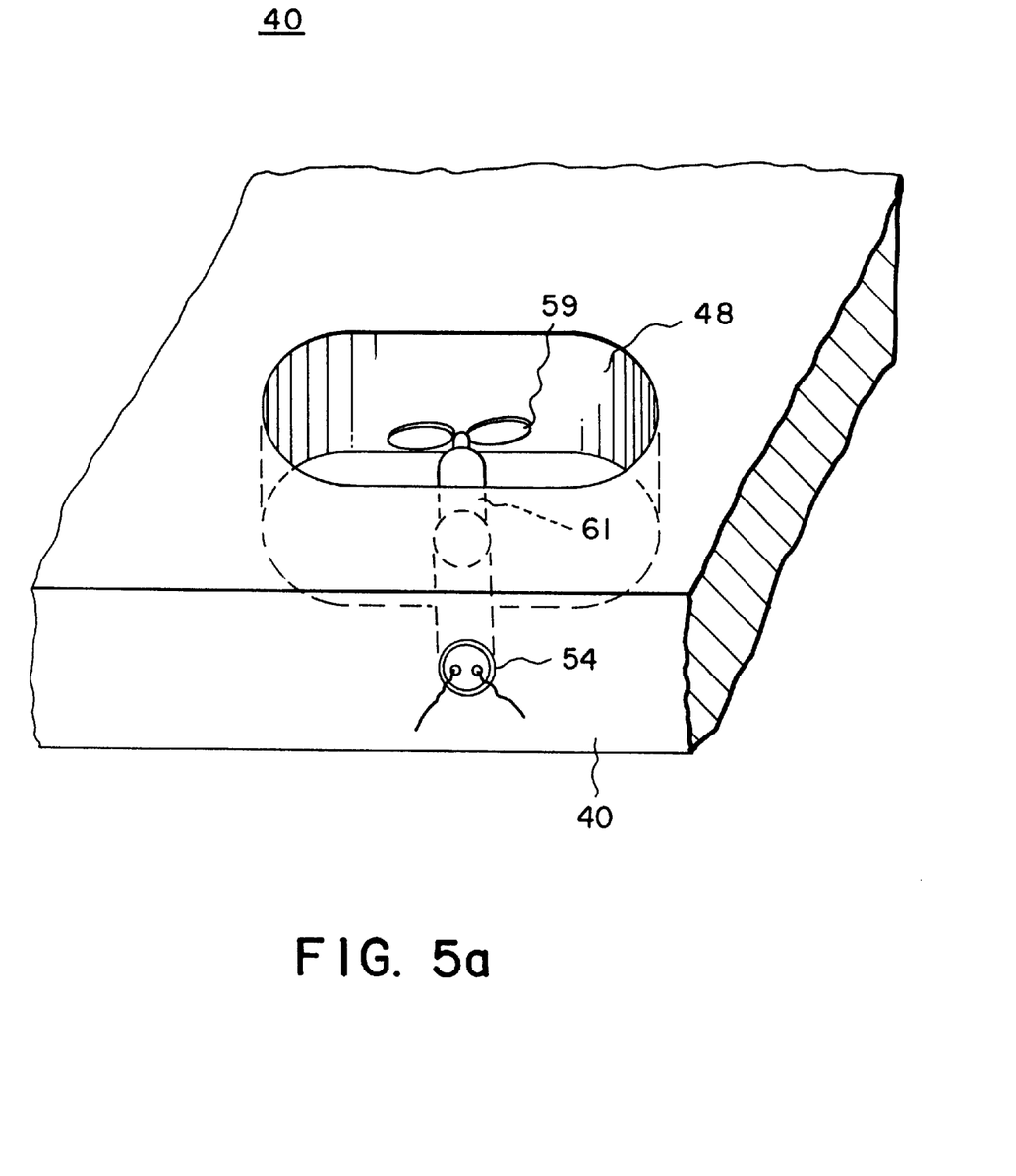
FIG. 5a is a partial perspective of the reaction chamber in FIG. 4a and provided with an electrical stirrer.

Referring to FIG. 5a, a partial perspective is shown of the reaction chamber. It is to be noted that the reaction chambers 44, 46 and 48 can have circular, rectangular, square, oval or any desirable geometric shapes. A feed-through hole is provided on one side of the reaction chamber 48 to insert an electrically operated stirrer for mixing reactants with turbulent motion. The stirrer 61 can be constructed from stainless steel having collapsible blades 59 made from plastic or stainless steel.

Figure 5B:
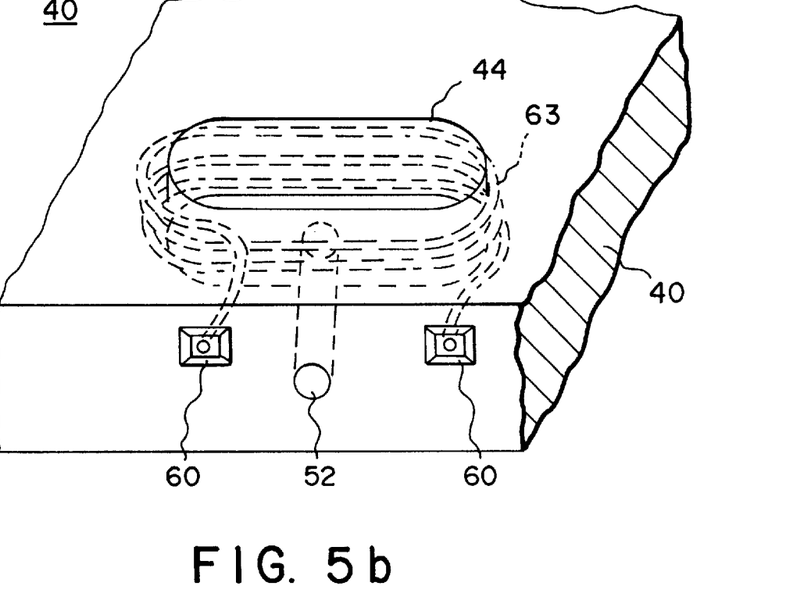
FIG. 5b is a partial perspective of the reaction chamber in FIG. 4a with embedded helical coil for heating.

Referring to FIG. 5b, a partial perspective is shown of the reaction chamber 44 having an embedded helical coil structure 63 which can be connected to an external power supply (not shown) through the electrically conductive pad 60 for heating the reaction chamber 44. There is also provided a feed-through hole 52 for inserting thermocouples or other analytical devices to monitor the chemical reaction process. The construction of the embedded helical coil structure 63 is achieved by molding the green ceramic with a sacrificial plastic coil or coils made from refractory metals such as W, Ta and Mo. Plastic sacrificial coil burn off during sintering in air. Refractory metal sacrificial coils are etched away with NaOH or ammonium hydroxide after the ceramic plant has been sintered. The procedure of providing embedded coil in ceramic body has been described in details by commonly assigned U.S. patent application Ser. No. 08/775,523, filed Jan. 2, 1997, entitled "Miniature Molded Ceramic Devices Having Embedded Spiral Coils" by Chatterjee et al, and commonly assigned U.S. patent application Ser. No. 08/775, 524 filed Jan. 2, 1997, entitled "Method for Forming Molded Ceramic Devices Having Embedded Spiral Coils", by Chatterjee et al, the teachings of which are incorporated herein by reference.

Figure 5C:
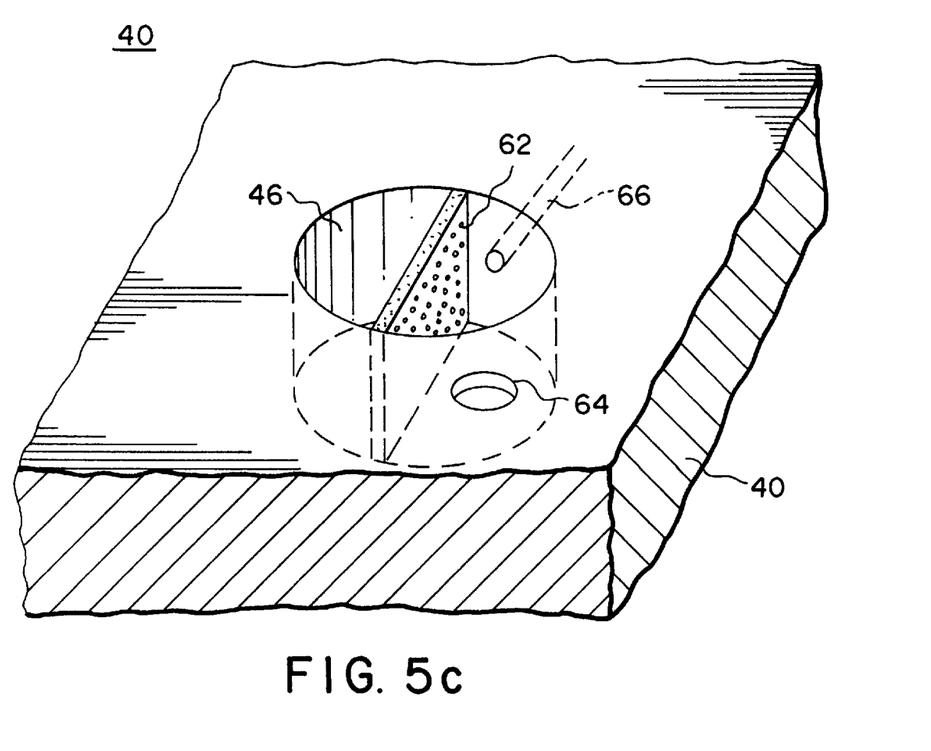
FIG. 5c is a perspective of a reaction chamber in FIG. 4a showing a ceramic filter.

Referring to FIG. 5c, a perspective is shown of the reaction chamber 46 being formed with compartments comprising a filter 62 which is also made from a selected ceramic and formed as an integral part of the unitary ceramic body 10. A through-hole 64 is provided at the bottom of the reaction chamber 46 to retrieve the solid precipitates. The through-hole 64 can be continuous through the successive layers to the fifth ceramic layer 200. Another fit through hole 66 is provided in the chamber to insert thermocouples and their connecting wires. It is to be noted each reaction chamber 44, 46 and 48 can be formed with compartments comprising one or more than one filters as an integral part of the unitary ceramic body 10.

Figure 6:
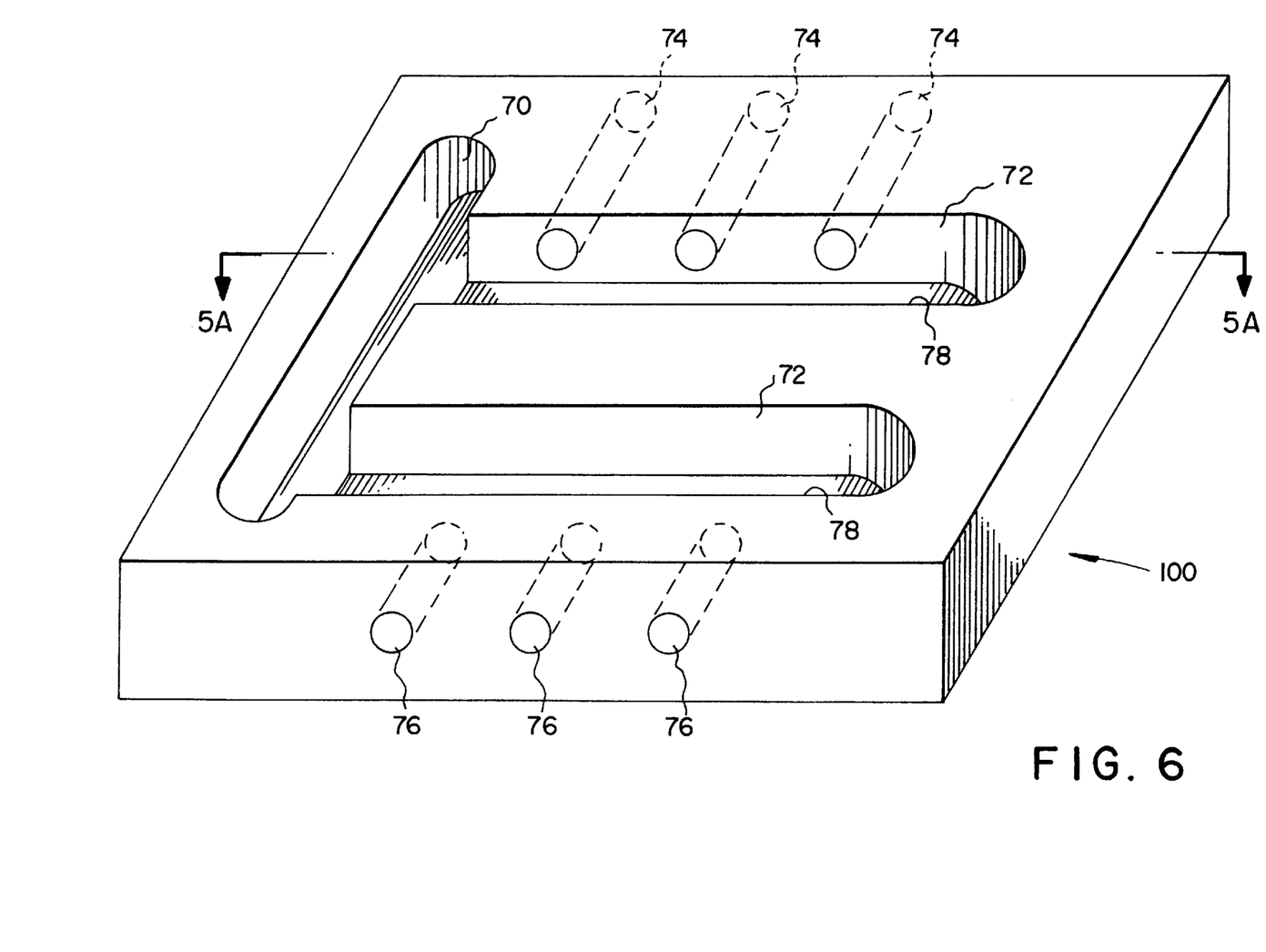
FIG. 6 is a perspective of the fourth ceramic layer from the top of the unitary ceramic body showing chambers for analyzing the chemical reaction processes.

Referring to FIG. 6, a perspective is shown of the analyzing chamber 100 of the unitary ceramic body 10. A holding tank 70 is strategically placed under the holding tank 50 (FIG. 4a) of the third ceramic layer 40. The holding tank 50 feeds the analyzing channels 72 which are provided with feed-through holes 74, 76 on both side of the fourth ceramic layer 100. Analytical tools such as mass and optical spectroscopy can be provided and communicate with the exterior of the unitary ceramic body 10 via fiber optic transmission. At the other end of the channels away from the holding tank 70 are located through-holes 78 to deliver the chemicals to the fifth ceramic layer 200.

Figure 7:
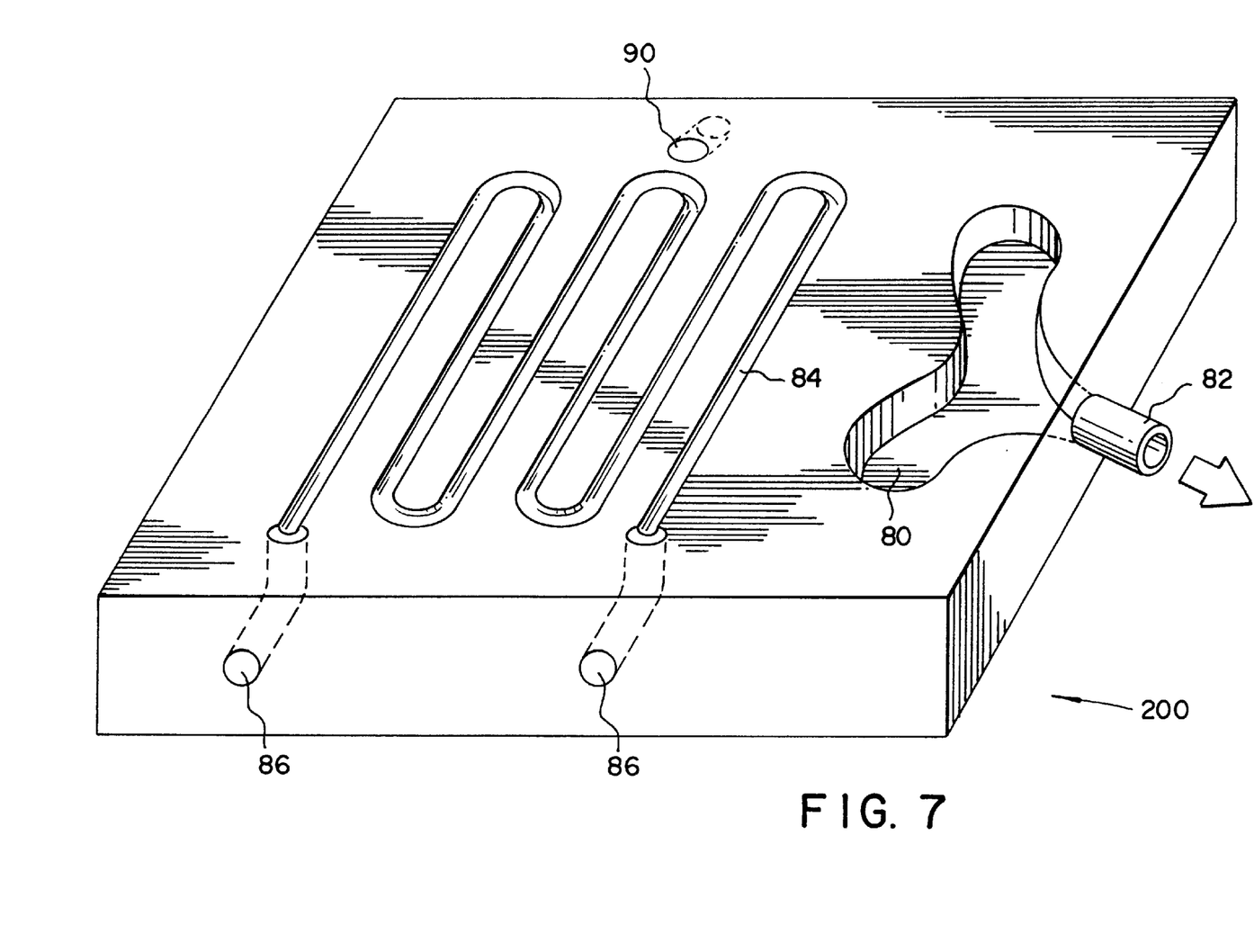
FIG. 7 is a perspective of the fifth ceramic layer residing at the bottom of the unitary ceramic body showing chambers for retrieving the products and also a heat unit for heating the ceramic body.

Referring to FIG. 7, a perspective is shown of the fifth ceramic layer 200 including discharging channels 80 for receiving chemicals through holes 78 to finally to the distribution vessels through a passageway 82. The fifth ceramic layer 200 is also provided with integrated heating elements having embedded heating coils 84 in order to heat the unitary ceramic body 10. The embedded heating coils 84 can be made from ceramic materials such as $MoSi_2$, $TiB_2$ and $ZrB_2$. The electrical leads 86 for the embedded heating coils 84 are located at the side of the fifth ceramic layer 200 and are an integral part of it. In order to monitor and control the temperature, a feed-through hole 90 is provided which protrudes at an angle from outside to the surface of the fifth ceramic layer 200.

The invention has been described in detail with particular reference to certain preferred embodiments thereof, but it will be understood that variations and modifications can be effected within the spirit and scope of the invention.

PARTS LIST 10 unitary ceramic body
12 passageways
13 through-holes
14 passageways
15 through-holes
20 top ceramic layer
24 channels
26 mixing channel
28 through-holes 29 through-holes
30 second ceramic layer
31 mixing chamber
40 third ceramic layer
42 distributing chamber
43 distributing chambers
44 reaction chamber
45 channel
46 reaction chamber
47 channel
48 reaction chamber
48a distributing manifold
50 holding tank
52 feed-through hole
54 feed-through hole
56 feed-through hole
57 through-hole
59 collapsible blades
60 conductive pad
61 stirrer
Parts List continued
62 filter
64 through-hole
66 feed-through hole
70 holding tank
72 analyzing channels
74 feed-through hole
76 feed-through hole
78 through-hole
80 discharging channel
82 passageway
84 embedded heating coil
86 electrical leads
90 feed-through hole
100 fourth ceramic layer
200 fifth ceramic layer

What is claimed is:

1. An integrated micro-ceramic chemical plant having a unitary ceramic body formed from multiple ceramic layers in the green state which are sintered together comprising:

(a) the unitary ceramic body defining a mixing chamber and passage means for providing communication with the mixing chamber so that two or more fluids may be delivered to such mixing chamber for mixing or reacting chemicals in the fluids; and (b) the unitary ceramic body including means for delivering the mixed chemicals to exit from the unitary ceramic body.

2. The integrated micro-ceramic chemical plant of claim 1 wherein the unitary ceramic body defines another chamber for use in analyzing the mixed chemicals.

3. An integrated micro-ceramic chemical plant having a unitary ceramic body formed from multiple ceramic layers in the green state which are sintered together comprising:

(a) the unitary ceramic body defining a reaction chamber and passage means for providing communication with the reaction chamber so that two or more fluids may be delivered to such reaction chamber for reacting chemicals in the fluids; and (b) the unitary ceramic body including means for delivering the reacted chemicals to exit from the unitary ceramic body.

4. The integrated micro-ceramic chemical plant of claim 1 wherein the unitary ceramic body defines another chamber for use in analyzing the mixed or reacted chemicals.

5. An integrated micro-ceramic chemical plant having a multiple layer unitary ceramic body formed from at least four ceramic layers in the green state which are sintered together comprising:

(a) the first ceramic layer being formed with passageways for dispensing at least two fluids containing chemicals;

(b) the second ceramic layer including a second layer mixing chamber being in communication with passageways for mixing the fluids containing chemicals;

(c) the third ceramic layer including a third layer reaction chamber for reacting the chemicals in the fluids; and (d) the fourth ceramic layer including a fourth layer analyzing chamber for use in analyzing the result of the chemical reactions.

6. An integrated micro-ceramic chemical plant having a multiple layer unitary ceramic body formed from at least four ceramic layers in the green state which are sintered together comprising:

(a) the first ceramic layer being formed with passageways for dispensing at least two fluids containing chemicals;

(b) the second ceramic layer including a second layer mixing chamber being in communication with passageways for mixing the fluids containing chemicals;

(c) the third ceramic layer including a third layer reaction chamber for reacting the chemicals in the fluids; and (d) the fourth ceramic layer including a fourth layer analyzing chamber for use in analyzing the result of the chemical reactions.

7. The integrated micro-ceramic chemical plant of claim 6 further including a fifth ceramic layer residing at the bottom portion of the said unitary ceramic body and defining means for delivering the mixed or reacted chemicals to exit from the unitary ceramic body.

8. The integrated micro-ceramic chemical plant of claim 6 further including a heating unit disposed in the unitary ceramic body for heating such unitary ceramic body.

9. The integrated micro-ceramic chemical plant of claim 7 wherein the second, third, fourth and fifth ceramic layers include capillaries or channels of circular cross-section.

10. The integrated micro-ceramic chemical plant of claim 7 wherein the capillaries or channels are selected to have straight, serpentine, complex, wavy or angular forms or shapes.

* * * * *